Nov. 7, 1950     A. C. BERNSTEIN     2,529,069
SCHOOL TO HOME SYSTEM
Filed Aug. 10, 1948     3 Sheets-Sheet 1
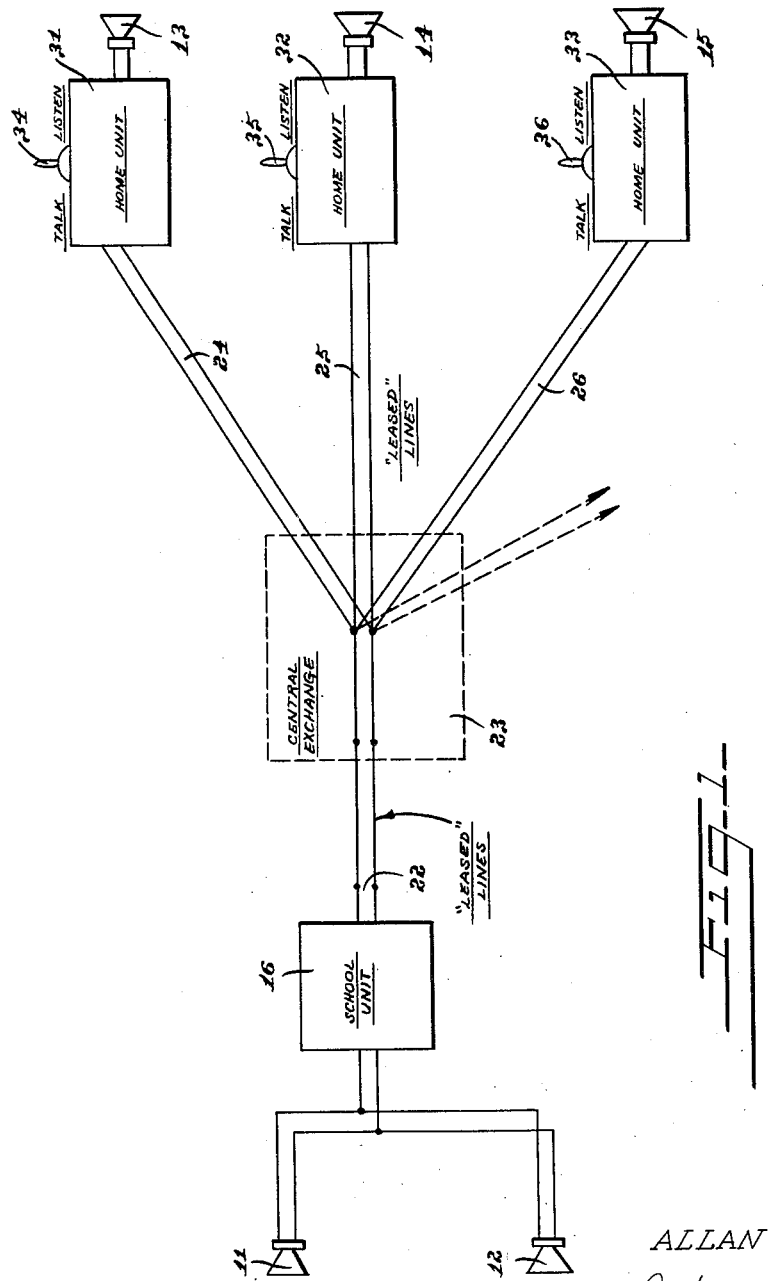
INVENTOR.
ALLAN C. BERNSTEIN
BY
ATTORNEYS

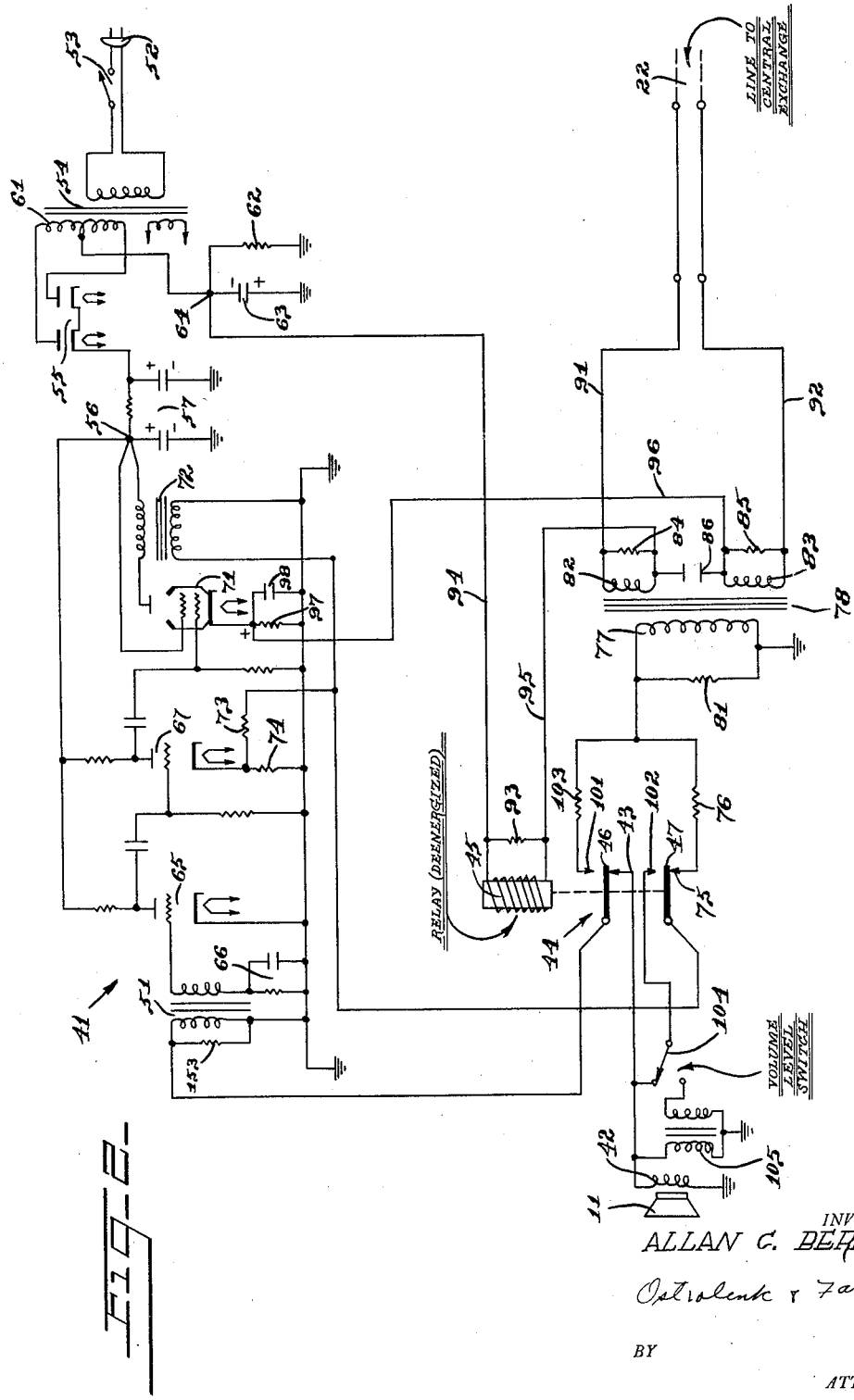

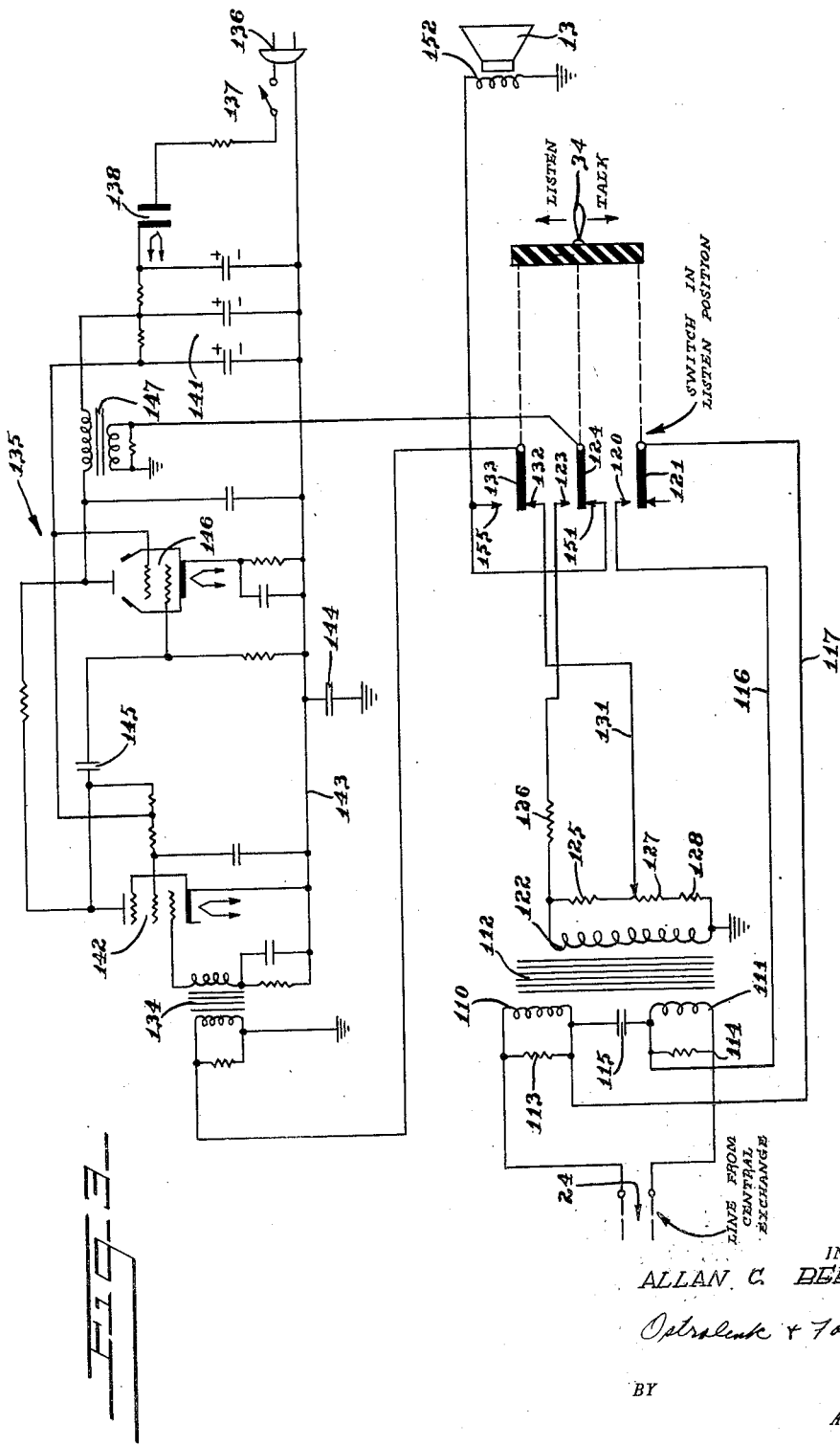

Patented Nov. 7, 1950

2,529,069

UNITED STATES PATENT OFFICE 2,529,069

SCHOOL TO HOME SYSTEM

Allan C. Bernstein, Brooklyn, N. Y.

Application August 10, 1948, Serial No. 43,470

18 Claims. (Cl. 179—1)

The present invention relates in general to the art of electrical signalling and more particularly to a novel intercommunication system enabling a plurality of persons to converse conveniently over conventional type telephone lines.

The broad teachings of the present invention, as will be seen from the discosure below, are widely applicable to systems for inter- and intra-office communication, fire alarm signalling, and the like. However, for the purpose of simplifying this discussion, detailed consideration will be confined to a representative installation which currently is solving a recognized complex educational problem.

Specifically, the problem is that of providing suitable means within financial reach for improving the educational facilities available to physically handicapped and bedridden children unable to attend school and pursue a normal scholastic course. Although heretofore numerous methods have been utilized and proposed for bringing education to such children, all such methods have had serious practical limitations.

It has been long recognized that self-instruction, or instruction with the aid of a part-time tutor, is difficult and uninteresting and that considerable therapeutic value could be attained by the association of the bedridden child with the classroom activities of other children of the same age. Another suggested procedure is that of recording entire classroom proceedings which the handicapped child would attend if normal conditions prevailed, and reproduce these recordings in the child's home at a subsequent time. This procedure has limited application due to the comparatively high cost of recording lengthy class-room discussions, and suffers the further disadvantage of limiting the child's activity to listening while barring participation in any manner.

It is possible to reduce expense somewhat by direct pick-up of the classroom proceedings by microphone and transmission by radio or leased telephone line to the home of the child. Although such procedure gives the child the advantage of hearing the proceedings while they are current, it still precludes participation.

The present invention contemplates and has as a primary object the provision of an electrical inter-communication system, particularly adapted for use in connection with leased telephone lines, for the exchange of information between a number of separated points, as for example, a classroom and the bedside of a physically handicapped child. As will be more fully disclosed hereinbelow, this novel inter-communication system permits conversation and lecture normally occurring in a classroom to be transmitted to a remote point for reproduction. By means at the control of the child, the reversal of signalling is effected so that the child may interrupt classroom proceedings to ask questions or to answer in recitation as if present in the actual classroom.

The advantages of an inter-communication system of this type from a psychological and educational viewpoint are readily apparent. The child, in effect, engages in substantially all features of school activity although not actually present. By virtue of the completeness of the educational program possible and by placing the child in an active association with other children, remarkable scholastic progress has been recorded.

To accomplish signal transmission over a leased telephone line, it is essential that the signal applied thereto is of sufficiently low level as to preclude interference with other telephone conversations flowing on adjacent lines with which electrical coupling is possible. That is to say, the phenomenon known as cross-talk must be precluded prior to acceptance of the system by the local telephone operating exchange. As a consequence, electrical energy developed from the sound pick-up must be of a general level suitable for application to the telephone line. At the remote end of the telephone line, that is, at the child's home, the received signals must be amplified to a level suitable for loudspeaker reproduction. In accomplishing reverse signal flow when the child speaks to the class, it is essential that signal level limiting be again provided so that suitable transmission over the telephone line may be effected.

It is therefore an object of the present invention to provide an audio inter-communication system for use in conjunction with a telephone line operating at an established, comparatively low signal level while permitting two-way reproduction at comparatively high signal level.

In normal operation, the inter-communication system for use between a classroom and a student at home is adjusted so that the classroom proceedings will be picked up and transmitted directly to the remote point for reproduction. When called upon for recitation, or when desiring to interpose a question into the proceedings, the student at home, by operation of simple switching apparatus, reverses the direction of amplification at both points and the direction of audio energy flow. For design simplicity and furthermore, for the purpose of permitting operation of a single school unit in conjunction with a plurality of leased telephone lines the amplifier reversal, although actuated by the student at home, is effected by means of a relay at the school. The novel circuit design employed in the present inter-communication system permits utilization of a single two wire telephone line between class and student for direct and reverse audio current and for carrying the switching signals.

It is accordingly a further object of the present invention to provide an inter-communication circuit which permits two-way audio transmission and also the actuation of amplifiers at opposed ends of the system for reverse operation over a single telephone line with all manual switching operations being confined to one end of said telephone line.

A still further object of the present invention is to provide an electrical inter-communication system for joining a classroom with one or more handicapped students at remote points, which permits any student to call into the classroom while all others on the system hear this call.

Still another object of the present invention is to provide an inter-communication system for operation over a telephone line wherein switching is accomplished by the application of a direct current to the telephone line in addition to the audio signal flowing therein.

Another object of the present invention is to provide an inter-communication system suitable for operation over telephone lines so that audio energy at one point may be transmitted successfully to a plurality of remote points while permitting persons at each of these remote points to communicate with all persons connected to the system including the point of origin.

These and other objects of the present invention will now become apparent upon consideration of the following detailed specification when taken in connection with the accompanying drawings in which:

Figure 1 is a general schematic diagram of a possible arrangement of the inter-communication system of this invention adapted for the transmission of information from a school to various remote points;

Figure 2 is a schematic circuit diagram of an embodiment of the electrical apparatus contained at the school end of the transmission system; and Figure 3 is a schematic circuit diagram of the electrical apparatus employed at the remote end of the inter-communication system.

With reference now to the drawings and more particularly to Figure 1 thereof, there is illustrated an inter-communication system incorporating the principles of the present invention and specifically adapted to suit the needs of the education of physically handicapped children confined to home or bed at points remote from the school. Broadly, this inter-communication system permits the two-way transfer of audio energy from one of the electrical transducers such as 11 and 12, located in one or more classrooms from which instruction is desired, to corresponding transducers such as 13, 14 and 15 at the homes of students at remote points. Corresponding to transducers 11 and 12 at the school, there is an electrical amplification school unit 16 which serves to interchange energy suitably with the transducer element in use.

Transducer elements such as 11 and 12 are located in various classrooms. Any one of these transducers may be connected to the school unit 16 to permit proceedings of a particular class to be connected with the remote point for the interchange of information. The output of the school unit 16 is, at terminal 22, connected to a leased telephone line extending to the central exchange 23 of the area served.

A leased line is a telephone line which is obtained for the exclusive use of the subscriber from the area telephone operating company for a specific purpose. It will be understood that one requirement of a leased telephone line operation is that the signal level applied thereto be no higher than a predetermined maximum established by the operating company as the level above which cross-talk becomes a particularly deleterious factor. In the discussion that follows on circuit design considerations, it will be assumed that maximum operating level permissible on the telephone line is known.

Radiating from the central telephone exchange 23 are a plurality of leased lines such as 24, 25 and 26, one of which is directed to each of the homes of the physically handicapped students utilizing the system illustrated or to a party line reaching the homes of one or more of the handicapped children. The electrical apparatus required at each home is contained in what herein is termed a "home unit." Thus, home units 31, 32 and 33 are connected to leased lines 24, 25 and 26, respectively, and are adapted for the interchange of energy with electro-mechanical transducers 13, 14 and 15, respectively. Considering the system as a whole, then two-way sound transmission is possible between electro-mechanical transducer 11 and each of electro-mechanical transducers 13, 14 and 15 through central exchange 23 and over the corresponding leased lines to the home units.

As will become apparent from the detailed information to be provided below, in normal operation transducer 11 serves as a microphone for the pick-up of sound energy within the class-room and transducers 13, 14 and 15 serve as loudspeakers in the homes. This condition prevails continuously until one of the physically handicapped students listening at home is requested by the teacher to participate in the classroom discussion, or desires to ask a question. Under these circumstances, the student presses a switch 34, 35 or 36 at the corresponding home unit and displaces it from the normal Listen to the Talk position.

Actuation of one of the switches 34, 35 or 36 reverses the energy flow relation over the corresponding leased telephone line and, in addition, reverses the effective operation of transducer 11 at the school and the transducer connected to the home unit whereat the switch was actuated. Thus, should the student at home unit 31 move switch 34 to the Talk position, transducer 13 operates as a microphone and transducer 11 operates as a loudspeaker and the circuits are altered whereby a student speaking into microphone 13 will plainly be heard by the teacher and class listening to the output of loudspeaker 11 and by all students at the remaining home units such as 32 and 33.

In this manner, it is evident that physically handicapped students confined to their homes may partake actively in discussion and proceedings of a classroom, and that all discussion is heard by all parties to the electrical communication system illustrated. It will be noted that if it is desired to transmit the discussion occurring in the classroom in which transducer 12 is located, then transducer 11 need only be disconnected from the school unit 16 and transducer 12 connected thereto to place the signal output of transducer 12 on the leased telephone line.

Having described the broad aspects of the present intercommunication system, reference is now made to the schematic circuit diagram of Figure 2 which illustrates the electrical components comprising school unit 16 associated with transducer 11 of Figure 1. In the apparatus shown in Figure 2 connecting electro-mechanical transducer 11 and school unit 16, there is included an amplifier 41, and means for energizing this amplifier input by means of signals originating at transducer 11 when operative as a microphone, and means for energizing transducer 11 when operative as a loudspeaker from the output of amplifier 41, as required. The electrical circuit diagram of Figure 2 illustrates the components in their normal condition wherein transducer 11 is operative as a microphone in a classroom or the like, and audio signals originating thereat are applied at suitable level to outgoing leased line 22 for energizing remote home units.

Transducer 11 is preferably a permanent magnet type dynamic unit which, as is well known, is particularly suited for operation as either microphone or loudspeaker. In Figure 2, the voice coil 42 of the transducer 11 is connected through wiring within the school building to a contact 43 of a double-pole, double-throw relay 44, the actuating coil 45 of which is normally de-energized. When relay coil 45 is energized, switch arms 46 and 47 are actuated thereby to interchange connections for purposes to be described in greater detail below. In the condition illustrated in Figure 2, relay switch arm 46 is engaged with contact 43 and thereby couples the output signal of voice coil 42 of transducer 11 to the primary coil of an input transformer 51 of amplifier 41.

Generally speaking, amplifier 41 comprises two resistance coupled voltage amplifier tubes driving a beam power output tube. Amplifier 41 and other circuit components are energized from a power supply connected to a suitable alternating current source at plug 52. Closure of switch 53 energizes a power transformer 54 which, in turn, provides filament current for the amplifier tubes and drives the plates of twin diode rectifier 55. At terminal 56, which is the output of a resistance capacity filter 57, extending from the rectifier cathodes, a positive direct voltage is obtained for amplifier operation.

It will be noted that the center tap of coil 61 is connected to ground through a resistor 62 shunted by a suitable filter capacitor 63. This arrangement provides, at terminal 64, a negative direct power source for use in a manner to be described.

The secondary of input coupling transformer 51 is connected between the control grid of amplifier tube 65 and ground through a grid biasing circuit 66. Triode electron tube 67 is energized by the signal output appearing at the plate of amplifier 65 and is connected as a conventional resistance capacitance coupled triode amplifier. The output of amplifier tube 67 is utilized to drive the control grid of beam power tube 71, the plate of which is returned to positive terminal 56 through the primary winding of the signal output transformer 72. The secondary of output transformer 72 is connected between ground at one end thereof and switch arm 47 of relay 44. In addition, the secondary of output transformer 72 is utilized to provide an inverse feedback potential which is introduced into the cathode circuit of electron tube 67. Resistors 73, 74 act as a voltage divider to limit the amount of feedback, and also act as an un-bypassed cathode bias resistor for electron tube 67. As illustrated, relay contact arm 47 is engaged with contact 75 when the relay 44 is de-energized and accordingly a circuit is made from the secondary of amplifier output transformer 72 through contact 75 and through resistor 76 to the primary winding 77 of a line matching transformer 78. The primary 77 of transformer 78 is shunted by a resistor 81 which resistor, in series with resistor 76, forms a voltage divider for the output potential of transformer 72. Thus, the signal applied to line transformer 78 is limited to that fraction of the output of beam power tube 71 which is required to suitably energize leased line 22 at its predetermined operating level.

The secondary of transformer 78 is split into windings 82 and 83, which windings are shunted by line matching resistors 84 and 85, respectively. The secondary windings 82 and 83 are, however, coupled by means of series capacitor 86, the impedance of which is relatively low when considered at the voice frequency band of transmission. Thus, for voice frequencies, windings 82 and 83 are effectively joined and, as illustrated, are directly coupled by means of lines 91 and 92 to leased line 22 as shown in the drawing.

Thus, even without further description of the elements illustrated in Figure 2, it is apparent that with relay 44 in a de-energized state, as shown, the transducer 11 may act as a microphone to convert classroom sound into electrical signals appearing in the output of the transducer voice coil 42. These signals are coupled through contact 43 and relay arm 46 to input transformer 51 of amplifier 41. The amplified output signals appearing at output transformer 72 are coupled through relay arm 47 and contact point 75 to primary coil 77 of line transformer 78 through a resistive voltage dividing network comprising resistors 76 and 81 in order that the signal transferred through line transformer 78 be of a level suitable for operation of a leased telephone line without cross-talk or other undesirable interference with adjacent channels. Secondary coils 82 and 83 of transformer 78 are series connected by means of capacitor 86 for voice frequency continuity. However, capacitor 86 precludes the flow of direct current between the secondary coils.

One end of coil 45 of relay 44 is connected by lead 94 to the negative potential terminal 64 of the rectifier power source. The opposite end of relay coil 45 is connected by lead 95 to one end of capacitor 86. The opposite end of capacitor 86 is connected by means of lead 96 to the cathode of beam power tube 71 in amplifier 41. By virtue of cathode bias resistor 97 and its associated bypass capacitor 98, the cathode of beam tube 71 is at an appropriate positive potential. The use is made of the cathode bias circuit as a positive potential source simply because of its ready availability.

It will now become apparent that if a direct current shunt is provided across leased line 22 in some manner and at any point along its length as it extends from the circuit illustrated in Figure 2, that a direct current path will be provided as follows: from negative potential point 64 through lead 94, through relay coil 45, through lead 95 to transformer secondary 82, through winding 82 to line 91 and across the direct current shunt of line 22 (as suggested above) through lead 92 and attached secondary winding 83, and through lead 96 to the positive potential point at the cathode of beam power tube 71. In other words, if a direct current path is provided between wires of leased line 22, a complete direct current circuit is provided which, in effect, by-passes capacitor 86 and extends from the positive potential point at the cathode of beam tube 71 to the negative potential point 64 of the power supply, through the relay coil 45, thereby energizing relay 44.

Energization of the relay 44 will disengage the relay contact arms 46 and 47 from contacts 43 and 75 respectively, and bring the arms into electrical engagement with contacts 101 and 102, respectively. This, it will now be shown, reverses the operation of the school portion of the system by reversing effectively the input and output connections of amplifier 41.

The engagement of relay arm 46 and contact 101 completes an electrical circuit from input transformer 51 of the amplifier 41 to the primary coil 77 of the line transformer 78 through a resistor 103. Consequently, if electrical signals are applied at another point to leased line 22, these signals, through capacitively connected secondaries 82 and 83, induce a signal in primary 77 which in turn is impressed upon the input of amplifier 41. Resistor 103, and the primary of input transformer 51 shunted by resistor 153 form a voltage divider in this circuit which reduces the incoming signal to a level suitable for application to the input of amplifier 41 without causing overloading or distortion thereof. The energization of relay 44, by also raising contact arm 47 into engagement with contact 102, connects the secondary of output transformer 72 through the relay arm 47 to the voice coil 42 of the electrical transducer 11. In summary, therefore, when relay 44 is energized, audio signals appearing upon leased line 22 will be impressed upon the input of amplifier 41, and the output thereof will be seen to drive transducer 11 as a loud-speaker for the reproduction of these audio signals. The net amplification of the circuit from leased line 22 to transducer 11 is low enough to prevent hearing cross-talk from adjacent telephone lines, unless such cross-talk is of high enough magnitude to be heard by a standard telephone instrument connected to line 22.

Contact 102 of the relay 44 is connected to the voice coil 42 of the transducer 11 through a volume level switch 104. In the position shown, the volume level switch 104 has no effect upon the reproduction of the output signal as it passes from contact 102 through voice coil 42. However, when the volume switch is thrown into its opposite position, a step-down transformer 105 is introduced between the contact 102 and the voice coil 42. This provides a fixed reduction of volume which is suitable for operation of loudspeaker 11 at a reduced energy level. It will, of course, be understood that other suitable volume control methods may be employed.

To further understanding of the over-all intercommunication system reference is now made to Figure 3, which illustrates a schematic circuit diagram of the home unit used by the student in listening and partaking in classroom discussions originating at the transducer 11 of Figure 2. Assuming the home unit of Figure 3 to be that designated as 31 in Figure 1, the incoming leased line is correspondingly designated as 24. The transducer 13 and the Listen-Talk switch 34 are also referenced as in Figure 1.

Although the central exchange supplying the leased line is shown neither in Figure 2 nor Figure 3, it will be understood that the line 22 of Figure 2 connects directly with the line 24 in Figure 3 insofar as signalling is concerned. The Listen-Talk switch 34 of Figure 3 is in the Listen position, corresponding in this system with the de-energized state of relay 44 in Figure 2. In other words, transducer 11 of Figure 2 is operative as a microphone and transducer 13 in Figure 3 is operative as a loudspeaker.

With particular reference to Figure 3, the input signal from leased line 24 is applied to split primary windings 110 and 111 of an input line matching transformer 112. The primary windings 110 and 111 are shunted by suitable line matching resistors 113 and 114, respectively, and are series connected for audio frequencies in the band of operation by means of a comparatively large capacitor 115. The opposed ends of the capacitor 115 are electrically connected by means of leads 116 and 117 to a contact 120 and to switch arm 121 of the Listen-Talk switch 34 as shown. Arm 121 is not in electrical engagement with contact point 120 and accordingly, capacitor 115 is in no way electrically affected thereby. However, closure of contacts 120 and 121 will short-circuit capacitor 115 and through coils 110 and 111, provide a direct current path between the wires of leased line 24. The results of this circuit change will be considered again hereinbelow.

Secondary winding 122 of the input line transformer 112 is grounded at one end thereof and at the other end connected through resistor 126 to contact 123 associated with switch arm 124 of Listen-Talk switch 34. Winding 122 is shunted by series resistors 125, a volume control variable resistor 127 and fixed resistor 128. With the Listen-Talk switch 34 in the position shown, contact 123 is open-circuited. However, the adjustable output from volume control 127 is, by lead 131, connected to contact point 132 which, through engaged switch arm 133 of the Listen-Talk switch 34 is connected to the primary of input transformer 134 of an amplifier 135.

The amplifier 135 at the home unit of Figure 3 has been designed for A. C.-D. C. operation. Thus, the line plug 136, when connected to a suitable A. C. or D. C. power line, through switch 137, energizes the plate of rectifier tube 138. The rectified output of this tube is filtered by a resistance capacity filter 141 to provide the necessary operating positive direct current potential.

The secondary of the input transformer 134 is connected between the grid of voltage amplifier pentode 142 and a common wire 143, the latter being connected to ground through a suitable capacitor 144. Pentode 142 is a conventional high gain audio amplifier tube, the output of which is coupled through capacitor 145 to the control grid of a beam power amplifier 146, connected in a manner conventional for such tubes. The plate of the beam tube 146 is connected to the positive rectified power source through the primary of an output transformer 147, the secondary of which is connected between ground and switch arm 124. Contact 151, shown as engaging switch arm 124, is connected directly to the voice coil 152 of the transducer 13. As described in connection with transducer 11 of Figure 2, it is preferable that transducer 13 comprise a permanent magnet, dynamic type unit capable of successful microphone or loudspeaker operation.

In viewing the operation of the circuit of Figure 3, with Listen-Talk switch 34 in the position shown, it is apparent that audio signals appearing on leased line 24 are applied through transformer 112 and over lead 131 from the volume control 127 through contact 132 to the switch arm 133 and to input transformer 134 of amplifier 135. The amplified output signal is coupled from output transformer 147 through switch arm 124 and contact 151 of the Listen-Talk switch to the voice coil of transducer 13, operating as a loud-speaker. Since, with the relay 44 of Figure 2 in the de-energized state shown, the sound picked up by transducer 11 is converted to audio signals and applied to leased line 22 which in turn is coupled to leased line 24 of Figure 3, it is clear that signals originating in the classroom containing microphone 11 may be heard at the home containing transducer unit 13.

Operation in this manner, which is the normal state of the circuits, will continue until Listen-Talk switch 34 at the home unit of Figure 3 is pressed to the Talk position. With particular reference to this switch in Figure 3, it will be noted that the switch arms 121, 124 and 133 are mechanicaly ganged and simultaneously operated by the hand lever attached to the switch.

When switch 34 is operated into the Talk position (and a latch may be provided to maintain the switch in this position as long as desired) the three ganged switch arms 121, 124 and 133 move upwardly into contact with contacts 129, 123 and 155, respectively. The engagement of switch arm 121 and contact 120 will short-circuit capacitor 115 and provide a direct current path between windings 110 and 111 and thereby provide a continuous direct current path between the wires of leased line 24.

In the above discussion of Figure 2, it was demonstrated that the provision of a direct current path between wires of leased line 24 (Figure 3) and leased line 22 (Figure 2) would serve to energize direct current responsive relay 44 and reverse the operation of the school unit illustrated in Figure 2; that is, change the operation of transducer 11 from microphone to loudspeaker and reverse the effect of amplifier 41.

Hence, the operation of Listen-Talk switch 34 at the home unit in Figure 3, reverses completely the mode of operation of the school unit shown in Figure 2. In addition to reversing the operation of the school unit, the operation of the home unit is correspondingly reversed to permit reverse transmission of audio signals. Thus, the engagement of switch arm 124 and contact 123 in Figure 3 completes a path from output transformer 147 of amplifier 135 to secondary winding 122 of the line transformer 112. Resistor 126, in series with the parallel combination of the effective input impedance of winding 122 of transformer 112, shunted by resistors 125, 127, 128, acts as a voltage divider for the output of amplifier 135, in order that the signal transferred to line 24 be of a level suitable for operation of a leased telephone line. The engagement of switch arm 133 with contact arm 155 completes an electrical circuit from voice coil 152 of transducer 13 to input transformer 134 of amplifier 135. Transducer 13, operating as a microphone, converts the speech of the student at home to an audio signal which is impressed upon amplifier 135 and amplified to a suitable level which, through output transformer 147, is impressed upon line matching transformer 112.

Thus, when the Listen-Talk switch 34 in Figure 3 is pressed into the Talk position, sound impinged upon transducer 13 will be heard at transducer 11 acting as a loudspeaker. When this switch is returned to the Listen position, sound impressed upon transducer 11 will be heard at transducer 13, operating as a loudspeaker. The instructor at the school may ask a question of the student at the terminus of the leased line. By simply pressing Listen-Talk switch 34 to the Talk position, the student may reply. Control of reverse operation of the system is wholly within the hands of the student whereas part of the actual control mechanism, namely relay 44, is at the school equipment and responsive to a predetermined (direct current) control signal whenever applied.

When the complete system illustrated in Figure 1 is considered in the light of the specific circuit diagrams of Figures 2 and 3, it will be apparent that a plurality of units, such as shown in Figure 3, may be placed in parallel to accommodate physically handicapped students situated at widespread points. Since all the leased lines are in parallel, it is clear that the operation of the Listen-Talk switch of any one student will actuate relay 44. However, since all the lines are in parallel, the audio signal impressed upon the system by one student will be applied to the input circuits of the home units of all other students in addition to the input circuit of the school unit over leased line 22. Thus, all students on the line will hear the questions and answers of all other students.

The basic circuits illustrated in the drawings are known to lend themselves to use in numerous inter-communication systems. Although no attempt has been made to discuss fully all applications to which the circuits illustrated may be placed, it will be apparent that they need not be limited to the particular school-student transmission system described above.

Thus, in view of the possible modifications of the above-described system which may be accomplished by those skilled in the art, it is preferred that the spirit and scope of the present invention be limited solely by the appended claims.

I claim:

1. An electrical intercommunication system comprising electrical transducers at separated points, a two wire transmission line coupling said transducers, electrical switching apparatus for establishing the direction of energy flow between said transducers over said transmission means, said switching apparatus including manually operable means at one end of said transmission means adjacent one of said transducers and automatically operable means at the other end of said transmission means adjacent the other of said transducers, and means including said two wire transmission line for operating said automatically operable means by operation of said manually operable means.

2. An electrical intercommunication system comprising two electrical transducers at separated points coupled by a two wire transmission line extending therebetween, means including said transducers for transmitting audio frequency signals over said line electrical switching apparatus for establishing the direction of energy flow between said transducers, said switching apparatus including manually operable means at one end of said transmission means adjacent one of said transducers for applying a direct current to said transmission line and automatically operable means at the other end of said transmission means adjacent the other of said transducers responsive to said direct current.

3. An electrical intercommunication system comprising two electrical transducers at separated points, a two wire transmission line extending between said points and electrically coupling said transducers, means including said transducers for transmitting audio frequency signals over said line manually operable switching means at one end of said transmission means adjacent one of said transducers governing the application of a direct current to said transmission line, and automatically operable switching means responsive to said direct current at the other end of said transmission means adjacent the other of said transducers for governing the reversal of energy flow on said transmission line between said transducers.

4. An electrical intercommunication system comprising two electrical transducers at separated points, a two wire transmission line extending between said points and electrically coupling said transducers, means including said transducers for transmitting audio frequency signals over said line manually operable switching means at one end of said transmission means adjacent one of said transducers governing the application of a direct current to said transmission line, and automatically operable switching means responsive to said direct current and at the other end of said transmission means adjacent the other of said transducers for governing the reversal of energy flow on said transmission line between said transducers, said direct current being applied to said transmission line from a source at the end of said transmission line associated with said automatically operable switching means.

5. An electrical intercommunication system comprising first and second electrical transducers at first and second separated points respectively, a two wire transmission line extending between said points and electrically coupling said transducers, means including said transducers for transmitting audio frequency signals over said line, first switching means at one end of said transmission line for governing the reversal of energy flow between said first transducer and said transmission line and for governing the application of a direct current to said transmission line, second switching means at the other end of said transmission line for governing the reversal of energy flow between said second transducer and said transmission line and responsive to said direct current, and a source of said direct current at the end of said transmission line of said second transducer, said source and said second switching means being connected electrically in series with said transmission line.

6. In an electrical signalling system a transmission line extending between first and second separated points, means for interchanging audio frequency energy with said transmission line at said first and second points comprising audio frequency transformers, each of said transformers having a split winding connected to an end of said transmission line, capacitors electrically coupling the sections of each of said split windings, a relay and a direct current power source connected at said first end in series relation with said transmission line, and means at said second end for effectively short circuiting said capacitor at said second end for energizing said relay from said power source through said transmission line.

7. In an electrical signalling system a transmission line extending between first and second separated points, means for interchanging audio frequency energy with said transmission line at said first and second points comprising audio frequency transformers, each of said transformers having a split winding connected to an end of said transmission line, capacitors electrically coupling the sections of each of said split windings, a relay and a direct current power source connected at said first end in series relation with said transmission line, and means at said second end for effectively short circuiting said capacitor at said second end for energizing said relay from said power source through said transmission line, electrical transducers at said first and second points coupled to the respective audio frequency transformers, and means including circuit connections controlled by the operation of the aforesaid relay and said short circuiting means for reversing the direction of energy flow between said transducers.

8. In an electrical intercommunication system, a two wire transmission line extending between first and second separated points, electrical apparatus at said first point comprising an amplifier having input and output circuits, an electrical transducer, an audio frequency transformer having primary and split-secondary windings, a direct current power source and a direct current operated relay, a capacitor connecting the sections of said split secondary winding in series relation, the series combination of said sections and said capacitor being connected across said transmission line at said first point, said relay being connected in series relation with said power source and said transmission line, said transducer being normally connected to said input circuit of said amplifier through contacts of said relay, said output circuit of said amplifier being connected to said primary winding of said audio transformer through other contacts of said relay, whereby audio frequency electrical signals generated by said transducer are applied to said amplifier and the amplified output of said amplifier applied to said transmission line for transmission to said second point, and means at said second point for effectively short circuiting said transmission line for direct current thereby energizing said relay from said power source through said transmission line, said relay when energized being operative effectively to reverse the aforesaid input and output connections of said amplifier whereby audio frequency signals applied to said transmission line will be received at said first point, amplified by said amplifier and applied to said electrical transducer.

9. In an electrical intercommunication system, a two wire transmission line extending between first and second separated points, electrical apparatus at said first point comprising an amplifier having input and output circuits, an electrical transducer, an audio frequency transformer having primary and split-secondary windings, a direct current power source and a direct current operated relay, a capacitor connecting the sections of said split secondary winding in series relation, the series combination of said sections and said capacitor being connected across said transmission line at said first point, said relay being connected in series relation with said power source and said transmission line, said transducer being normally connected to said input circuit of said amplifier through contacts of said relay, said output circuit of said amplifier being connected to said primary winding of said audio transformer through other contacts of said relay, whereby audio frequency electrical signals generated by said transducer are applied to said amplifier and the amplified output of said amplifier applied to said transmission line for transmission to said second point, means at said second point for effectively short circuiting said transmission line for direct current thereby energizing said relay from said power source through said transmission line, said relay when energized being operative effectively to reverse the aforesaid input and output connections of said amplifier whereby audio frequency signals applied to said transmission line will be received at said first point, amplified by said amplifier and applied to said electrical transducer, means at said second point for receiving an audio frequency signal coupled to said transmission line at said first point and amplifying said received signal, and means at said second point for applying an audio frequency signal to said transmission line when said short circuiting means is operative.

10. In an electrical intercommunication system, a two wire transmission line extending between first and second separated points, electrical apparatus at said first point comprising a first amplifier having input and output circuits, a first electrical transducer, a first audio frequency transformer having primary and split-secondary windings, a direct current power source and a direct current operated relay, a first capacitor connecting the sections of said split secondary winding in series relation, the series combination of said sections and said capacitor being connected across said transmission line at said first point, said relay being connected in series relation with said power source and said transmission line, said first transducer being normally connected to said input circuit of said first amplifier through contacts of said relay, said output circuit of said first amplifier being connected to said primary winding of said first audio transformer through other contacts of said relay, whereby audio frequency electrical signals generated by said first transducer are applied to said first amplifier and the amplified output of said first amplifier applied to said transmission line for transmission to said second point; electrical apparatus at said second point comprising a second amplifier having input and output circuits, a second electrical transducer, a second audio frequency transformer having a split-primary winding and a secondary winding, and manually operable switching means, a second capacitor connecting the sections of said split primary winding in series relation, the series combination of these primary sections and said second capacitor being connected across said transmission line at said second point, said second transducer being normally connected to said output circuit of said second amplifier through contacts on said switching means, said secondary winding of said second audio frequency transformer being normally connected to said input circuit of said second amplifier through other contacts on said switching means, whereby audio frequency signals received over said transmission line from said first point applied to said second amplifier and the amplified output thereof applied to said second transducer, said manually operable switching means being arranged to short circuit said second capacitor when operated, and simultaneously to reverse the aforesaid input and output connections of said second amplifier whereby audio frequency signals generated by said second transducer are amplified in said second amplifier and applied to said transmission line through said second audio transformer for transmission to said first point.

11. In an electrical intercommunication system, a two wire transmission line extending between first and second separated points, electrical apparatus at said first point comprising a first amplifier having input and output circuits, a first electrical transducer, a first audio frequency transformer having primary and split-secondary windings, a direct current power source and a direct current operated relay, a first capacitor connecting the sections of said split secondary winding in series relation, the series combination of said sections and said capacitor being connected across said transmission line at said first point, said relay being connected in series relation with said power source and said transmission line, said first transducer being normally connected to said input circuit of said first amplifier through contacts of said relay, said output circuit of said first amplifier being connected to said primary winding of said first audio transformer through other contacts of said relay, whereby audio frequency electrical signals generated by said first transducer are applied to said first amplifier and the amplified output of said first amplifier applied to said transmission line for transmission to said second point; electrical apparatus at said second point comprising a second amplifier having input and output circuits, a second electrical transducer, a second audio frequency transformer having a split-primary winding and a secondary winding, and manually operable switching means, a second capacitor connecting the sections of said split primary winding in series relation, the series combination of these primary sections and said second capacitor being connected across said transmission line at said second point, said second transducer being normally connected to said output circuit of said second amplifier through contacts on said switching means, said secondary winding of said second audio frequency transformer being normally connected to said input circuit of said second amplifier through other contacts on said switching means, whereby audio frequency signals received over said transmission line from said first point applied to said second amplifier and the amplified output thereof applied to said second transducer, said manually operable switching means being arranged to short circuit said second capacitor when operated, and simultaneously to reverse the aforesaid input and output connections of said second amplifier whereby audio frequency signals generated by said second transducer are amplified in said second amplifier and applied to said transmission line through said second audio transformer for transmission to said first point, said switching means when operative to short circuit said second capacitor thereby energizing said relay at said first point from said power source through said transmission line, said relay when energized being operative effectively to reverse the aforesaid input and output connections of said first amplifier whereby said audio frequency signals generated by said second transducer will be received at said first point, amplified by said first amplifier and applied to said first electrical transducer.

12. In an electrical intercommunication system, a two-wire transmission line extending between first and second separated points, electrical apparatus at said first point comprising a first amplifier having input and output circuits, a first electrical transducer, a first audio frequency transformer having primary and split-secondary windings, a direct current power source and a direct current operated relay, a first capacitor connecting the sections of said split secondary winding in series relation, the series combination of said sections and said capacitor being connected across said transmission line at said first point, said relay being connected in series relation with said power source and said transmission line, said first transducer being normally connected to said input circuit of said first amplifier through contacts of said relay, said output circuit of said first amplifier being connected to said primary winding of said first audio transformer through other contacts of said relay, whereby audio frequency electrical signals generated by said first transducer are applied to said first amplifier and the amplified output of said first amplifier applied to said transmission line for transmission to said second point; electrical apparatus at said second point comprising a second amplifier having input and output circuits, a second electrical transducer, a second audio frequency transformer having a split-primary winding and a secondary winding, and manually operable switching means, a second capacitor connecting the sections of said split primary winding in series relation, the series combination of these primary sections and said second capacitor being connected across said transmission line at said second point, said second transducer being normally connected to said output circuit of said second amplifier through contacts on said switching means, said secondary winding of said second audio frequency transformer being normally connected to said input circuit of said second amplifier through other contacts on said switching means, whereby audio frequency signals received over said transmission line from said first point applied to said second amplifier and the amplified output thereof applied to said second transducer, said manually operable switching means being arranged to short circuit said second capacitor when operated, and simultaneously to reverse the aforesaid input and output connections of said second amplifier whereby audio frequency signals generated by said second transducer are amplified in said second amplifier and applied to said transmission line through said second audio transformer for transmission to said first point, said switching means when operative to short circuit said second capacitor thereby energizing said relay at said first point from said power source through said transmission line, said relay when energized being operative effectively to reverse the aforesaid input and output connections of said first amplifier whereby said audio frequency signals generated by said second transducer will be received at said first point, amplified by said first amplifier and applied to said first electrical transducer, and means at said first and second points for limiting audio frequency currents applied to said transmission line to the predetermined energy level of operation of said transmission line.

13. A communication system adapted for the education of students at points remote from school comprising, electrical apparatus at said school including a transducer for picking up classroom sound and generating corresponding audio frequency signals, means for amplifying said signals, transmission lines extending from said school to said remote points, said amplifying means at said school being coupled to said transmission lines, transducers at said remote points for reproducing said signals, a relay at school apparatus operative when actuated to reverse the direction of energy flow between said classroom transducer and said transmission lines, and means at each of said remote points for actuating said relay and simultaneously reversing the direction of energy flow between said transducer at the remote point from which said relay is actuated and the transmission line extending to said remote point, the energy flow relationship between transducer and transmission line at all remote points other than that from which said relay is actuated remaining unchanged, whereby energy flowing into said transmission line at said remote point from which said relay is actuated appears at all other remote transducers and at said school transducer.

14. In an electrical intercommunication system, a two wire transmission line extending between a first point and a central exchange, two wire transmission lines extending between said central exchange and a multiple of remote points, electrical apparatus at said first point comprising a first amplifier having input and output circuits, a first electrical transducer, a first audio frequency transformer having primary and split-secondary windings, a direct current power source and a direct current operated relay, a first capacitor connecting the sections of said split secondary winding in series relation, the series combination of said sections and said capacitor being connected across said transmission line at said first point, said relay being connected in series relation with said power source and said transmission line, said first transducer being normally connected to said input circuit of said first amplifier through contacts of said relay, said output circuit of said first amplifier being connected to said primary winding of said first audio transformer through other contacts of said relay, whereby audio frequency electrical signals generated by said first transducer are applied to said first amplifier and the amplified output of said first amplifier applied to said transmission line for transmission to each of said remote points; electrical apparatus at each of said remote points each comprising a second amplifier having input and output circuits, a second electrical transducer, a second audio frequency transformer having a split-primary winding and a secondary winding, and manually operable switching means, a second capacitor connecting the sections of said split primary winding in series relation, the series combination of these primary sections and said second capacitor being connected across said transmission line at each of said remote points, in each set of multiple remote electrical apparatus the said second transducer being normally connected to said output circuit of said second amplifier through contacts on said switching means, said secondary winding of said second audio frequency transformer being normally connected to said input circuit of said second amplifier through other contacts on said switching means, whereby audio frequency signals received over said transmission line from said first point are applied to each of said remote amplifiers and in each set of remote electrical apparatus the amplified output thereof is applied to said second transducer, said manually operable switching means being arranged to short circuit said second capacitor when operated and simultaneously to reverse the aforesaid input and output connections of said second amplifier whereby audio frequency signals generated by said second transducer are amplified in said second amplifier and applied to said transmission line through said second audio transformer for transmission to said first point.

15. In an electrical intercommunication system, a two wire transmission line extending between a first point and a central exchange, two wire transmission lines extending between said central exchange and a multiple of remote points, electrical apparatus at said first point comprising a first amplifier having input and output circuits, a first electrical transducer, a first audio frequency transformer having primary and split-secondary windings, a direct current power source and a direct current operated relay, a first capacitor connecting the sections of said split secondary winding in series relation, the series combination of said sections and said capacitor being connected across said transmission line at said first point, said relay being connected in series relation with said power source and said transmission line, said first transducer being normally connected to said input circuit of said first amplifier through contacts of said relay, said output circuit of said first amplifier being connected to said primary winding of said first audio transformer through other contacts of said relay, whereby audio frequency electrical signals generated by said first transducer are applied to said first amplifier and the amplified output of said first amplifier applied to said transmission line for transmission to each of said remote points; electrical apparatus at each of said remote points each comprising a second amplifier having input and output circuits, a second electrical transducer, a second audio frequency transformer having a split-primary winding and a secondary winding, and manually operable switching means, a second capacitor connecting the sections of said split primary winding in series relation, the series combination of these primary sections and said second capacitor being connected across said transmission line at each of said remote points, in each set of multiple remote electrical apparatus the said second transducer being normally connected to said output circuit of said second amplifier through contacts on said switching means, said secondary winding of said second audio frequency transformer being normally connected to said input circuit of said second amplifier through other contacts on said switching means, whereby audio frequency signals received over said transmission line from said first point are applied to each of said remote amplifiers and in each set of remote electrical apparatus the amplifier output thereof is applied to said second transducer, said manually operable switching means being arranged to short circuit said second capacitor when operated and simultaneously to reverse the aforesaid input and output connections of said second amplifier whereby audio frequency signals generated by said second transducer are amplified in said second amplifier and applied to said transmission line through said second audio transformer for transmission to said first point, said switching means when operative to short circuit said second capacitor thereby energizing said relay at said first point from said power source through said transmission line, said relay when energized being operative effectively to reverse the aforesaid input and output connections of said first amplifier whereby said audio frequency signals generated by said remote transducer from which said relay is actuated will be received at said first point and at all remote points other than that from which said relay is actuated, amplified by said first amplifier and at each of said other remote amplifiers and applied to said first electrical transducer and each of the said remote transducers other than that from which said relay is actuated.

16. In an electrical intercommunication system, a two wire transmission line extending between first and second separated points, electrical apparatus at said first point comprising an amplifier having input and output circuits, an electrical transducer, an audio frequency transformer having primary and secondary windings, a direct current power source and a direct current operated relay, a capacitor connected in series relationship with said secondary winding and said transmission line at said first point, said relay being connected in series relation with said power source and said transmission line, said transducer being normally connected to said input circuit of said amplifier through contacts of said relay, said output circuit of said amplifier being connected to said primary winding of said audio transformer through other contacts of said relay, whereby audio frequency electrical signals generated by said transducer are applied to said amplifier and the amplified output of said amplifier applied to said transmission line for transmission to said second point, and means at said second point for effectively short circuiting said transmission line for direct current thereby energizing said relay from said power source through said transmission line, said relay when energized being operative effectively to reverse the aforesaid input and output connections of said amplifier whereby audio frequency signals applied to said transmission line will be received at said first point, amplified by said amplifier and applied to said electrical transducer.

17. In a communication system having a first subscriber station and a second subscriber station and a two wire telephone line extending between said subscriber stations, a transformer terminating each end of said two wire telephone line, each of said transformers including a pair of primary windings and a condenser coupling each pair of windings at each terminal, each of said transformers also including secondary windings, a terminal unit at each subscriber station, the terminal unit at said first subscriber station being normally connected through said transformer winding thereat to said two wire telephone line for transmitting audio frequency signals over said two wire telephone line and said terminal unit at said second subscriber station being normally connected through said transformer winding thereat for receiving said audio frequency signals, a manually operable switch at said second subscriber station for completing an electrical by-pass circuit around said coupling condenser, a source of direct current, a relay connected across said coupling condenser at said first subscriber station, said by-pass switch at said second subscriber station completing a direct current energizing circuit from said direct current source over said two wire telephone line for energizing said relay when said switch is closed, circuit connections controlled by said relay when energized for selectively connecting the terminal unit at said first subscriber station for receiving audio frequency signals over said two wire telephone line and said manually operated switch at said second subscriber station connecting said terminal unit at said second subscriber station to transmit audio frequency signals over said two wire telephone line.

18. In a communication system having a main station and a plurality of remote stations and a two wire line extending between each remote station and main station, each two wire line connected to two common points at main station end, a transformer terminating each remote station end of said two wire line, a transformer connected by a two wire line to the said two common points terminating main station end of said two wire line, each of said transformers including a pair of first windings and a condenser coupling each pair of said first windings at each terminal, each of said transformers also including second windings, a terminal unit at each station, the terminal unit at said main station being normally connected through said transformer winding thereat to each of said two wire lines for transmitting audio frequency signals over said two wire lines and said terminal unit at each remote station being normally connected through said transformer winding thereat for receiving said audio frequency signals, a normally operable switch at each said remote station for completing an electrical by-pass circuit around said coupling condenser thereat, a source of direct current, a relay connected across said coupling condenser at said main station, said by-pass switch at each said remote station completing a direct current energizing circuit from said direct current source over said two wire line for energizing said relay when said switch is closed, circuit connections controlled by said relay when energized for selectively connecting the terminal unit at said main station for receiving audio frequency signals over said two wire line and said manually operated switch at each said remote station connecting said terminal unit thereat to transmit audio frequency signals over said two wire lines.

ALLAN C. BERNSTEIN.

REFERENCES CITED

The following references are of record in the file of this patent:

UNITED STATES PATENTS

| Number | Name | Date |
|---|---|---|
| 1,733,194 | Harris et al. | Oct. 29, 1929 |
| 2,054,933 | Frazier | Sept. 22, 1936 |
| 2,055,921 | Baker | Sept. 29, 1936 |
| 2,427,496 | Feldscher | Sept. 16, 1947 |